March 22, 1966  K. G. KING ETAL  3,242,415
INVERTERS
Filed Jan. 2, 1962  2 Sheets-Sheet 1

United States Patent Office 3,242,415
Patented Mar. 22, 1966

3,242,415
INVERTERS
Kenneth G. King and Donald Garbett, London, England, assignors to Westinghouse Brake and Signal Company Limited, London, England
Filed Jan. 2, 1962, Ser. No. 163,842
Claims priority, application Great Britain, Jan. 6, 1961, 624/61
2 Claims. (Cl. 321—45)

This invention relates to inverters which are employed to produce an alternating current supply output from a direct current supply input, and more particularly to inverters in which are incorporated semi-conductor switching devices such as controllable semi-conductor rectifiers.

It is an object of the present invention to provide an improved inverter of this type which has a nearly sinusoidal output waveform, good inherent regulation and the ability to operate into variable loads without critical adjustment.

The present invention consists in an inverter which includes a number of semi-conductor switching devices and a resonant circuit tuned to a frequency close to that of the operating frequency of the inverter, wherein rectifiers are connected in reverse parallel with the switching devices to permit the flow of energy in the resonant circuit in the reverse direction to that permitted by the switching devices for each half-cycle of the inverter output.

Figure 1:
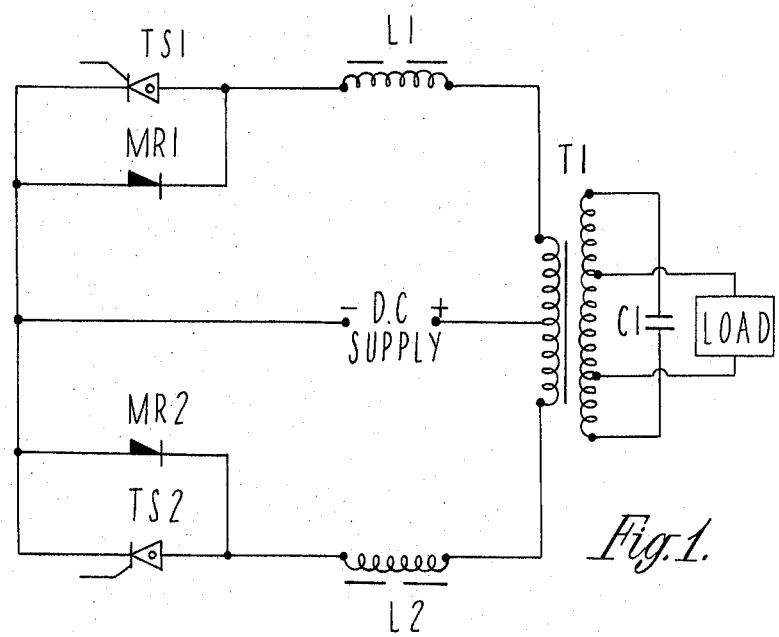
FIGURE 1 shows one form of inverter according to the present invention.

In carrying the invention into effect according to one convenient mode by way of example, as shown in FIGURE 1, an inverter includes two semi-conductor switching devices in the form of controllable semi-conductor rectifiers TS1 and TS2 connected to a D.C. supply, each through one half of the primary winding of a transformer T1 and a series inductor L1 or L2. A rectifier MR1 or MR2 is connected in reverse parallel, i.e., with opposite polarity, with each controllable rectifier TS1 or TS2. The combination of the controllable rectifier TS1 and the reverse parallel rectifier MR1 constitutes first switching means, and similarly rectifiers TS2 and MR2 constitute second switching means.

FIGURES 2a to i show various waveforms associated with this circuit which operates as follows.

When controllable rectifier TS1 is fired by a firing pulse (see FIGURE 2a), produced by suitable means not shown, current flows from the positive terminal of the supply through the primary of T1 and L1 (as shown in FIGURE 2c) so as to charge condenser C1 and apply an approximately sinusoidal voltage to the load, provided that this is not of excessively low impedance.

When condenser C1 is fully charged and the current falls to zero, rectifier TS1 is turned off and the condenser C1 then discharges back into the supply through rectifier MR1 as shown in FIGURE 2d.

If desired, an additional capacitor (not shown) may be connected across the D.C. supply to assist the absorption of returned current.

Soon after this return current starts to flow through rectifier MR1, TS2 is fired by a firing pulse (FIGURE 2b) and the reversal of the polarity of the charge on condenser C1 is assisted by current flowing from the D.C. supply through rectifier TS2 and inductor L2 as shown in FIGURE 2f.

Rectifier TS2 is then turned off and condenser C1 discharges back into the supply through rectifier MR2 as shown in FIGURE 2g.

The sequence of events is continued with the firing of rectifier TS1 again shortly after rectifier TS2 has been switched off, so that the operation is thus symmetrical, the conduction periods of a controllable rectifier TS1 or TS2 in one half of the cycle corresponding approximately to the conduction periods of the rectifier MR1 or MR2 in the other half of the cycle. The net current drawn from the supply is the difference between the controllable rectifier and the other rectifier currents, comprising a direct current component with even harmonics of the operating frequency.

Figure 2:
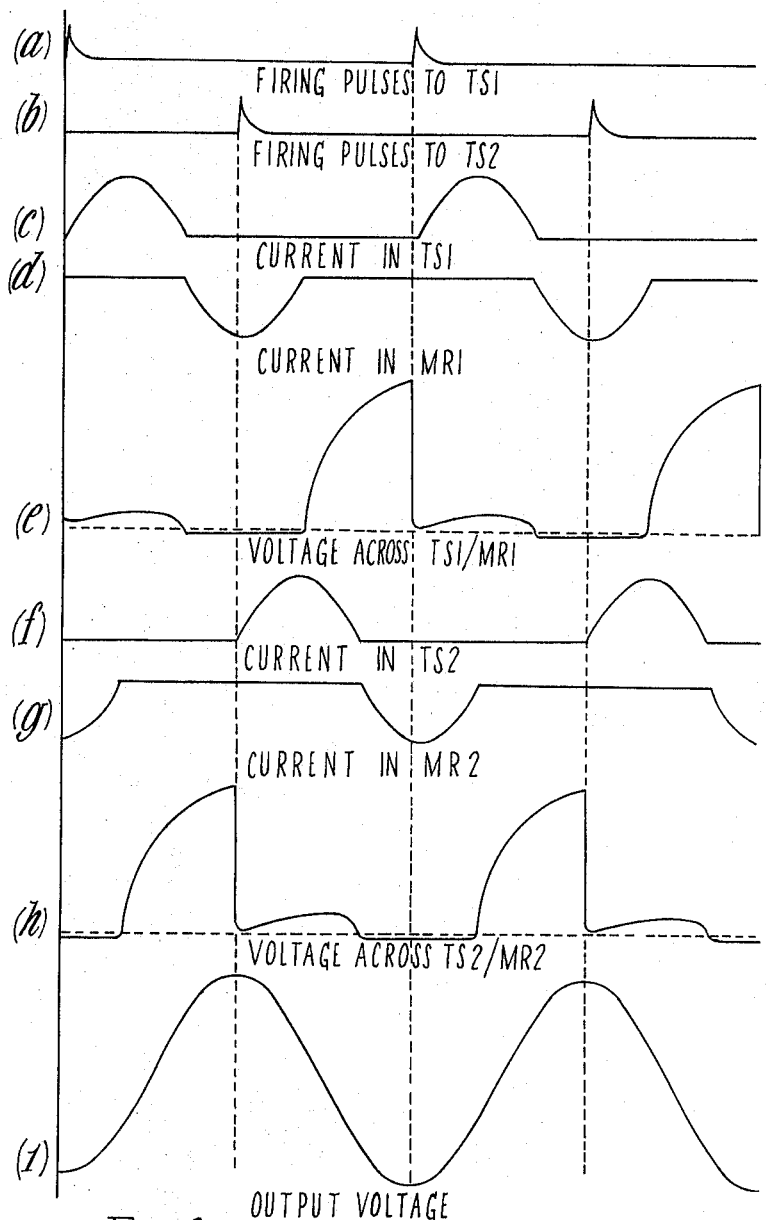
FIGURE 2 shows various waveforms associated with the inverter of FIGURE 1.

It should be noted from the waveforms shown in FIGURE 2 that once a firing pulse has been applied to a controllable rectifier, the manner in which the currents and voltages vary will depend upon the circuit constants, and a further firing pulse upon the same controllable rectifier cannot be effective until the natural cycle has been completed. The firing pulse repetition frequency therefore must not exceed the natural frequency of the circuit.

TS1 and TS2 are controllable rectifier devices of the type which are rendered conducting upon the application thereto of triggering pulses and are subsequently only rendered non-conducting when the current therein falls below a sustaining current or tends to reverse. The oscillating nature of the output circuit is such as to cause the voltage on the primary of T1 to swing forward and reverse in respect of each controllable rectifier device so the circuit is self-commutating in that turn-off of TS1 and TS2 at the required times is automatic.

It will also be apparent that as the load impedance is reduced the periods of conduction of the controllable rectifiers increase so as to decrease the turned-off or recovery periods of the controllable rectifiers until they fail to turn off at all. This then determines the load impedance below which the inverter will fail.

Figure 3:
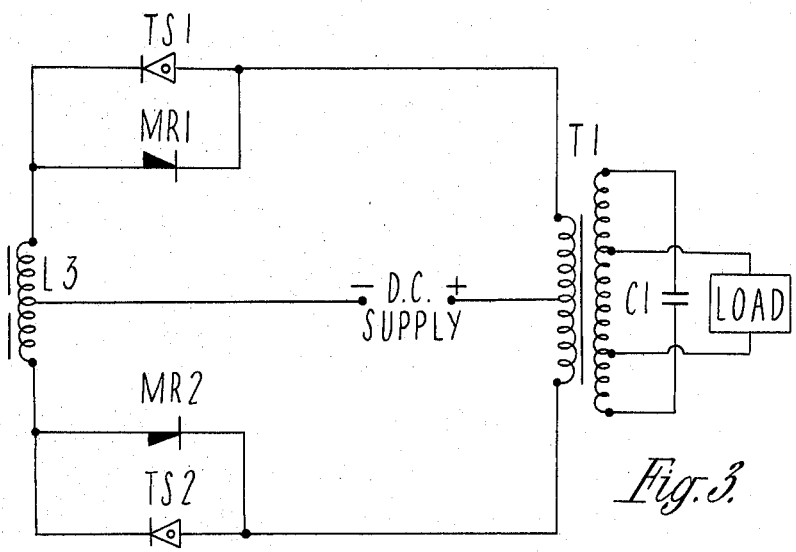
FIGURE 3 shows an alternative form of inverter according to the present invention.

If desired, the two inductors L1 and L2 may be replaced by a centre-tapped inductor L3 as shown in FIGURE 3. The load and the capacitor C1 may be connected to suitable windings on the output transformer in a variety of ways.

The inverter described above may be arranged to possess the following advantages:

(i) The output waveform is approximately sinusoidal, with a low proportion of harmonics even with no harmonic filter.

(ii) The inverter will operate on no load.

(iii) Load regulation is inherently good.

(iv) Since the controllable rectifier current falls naturally to zero before the turn-off period, the turn-off time required is lower than in normal parallel inverters, and the circuit is suitable for high-frequency operation.

(v) The controllable rectifiers are protected by the rectifiers in parallel with them against reverse voltages, minimising the risk of damage and facilitating the selection of controllable rectifiers with high-voltage breakover characteristics.

The value of the capacitor is established by making its reactance at the resonant frequency less than the maximum load to be supplied, and a satisfactory value is one-third. A value of C1 referred to each half of the primary winding can then be calculated.

The values of L1 and L2 are chosen so that they will resonate with the referred value of C1 at a frequency somewhat higher than the output frequency. An acceptable output wave form is obtainable when the resonant frequency is 50% higher than the output frequency.

Although the invention has been described primary with reference to controllable semi-conductor rectifiers, it will be realised that other semi-conductor switching devices such as switching transistors may be employed in their place.

Protection against moderate overloads may be achieved by arranging for the firing pulses to the controllable rectifiers to be interrupted in the event of the output current exceeding the maximum value for which the inverter is designed, so that the inverter will cease to operate and will be left in a safe (non-conducting) condition.

The current rating of the inverter may be increased by using groups of controllable rectifiers connected or operating effectively in parallel. In this case, the inductors L1 and L2 may be divided into a number of inductors equivalent to the number of parallel controllable rectifiers so that they assist in the accurate sharing of current between the controllable rectifiers, irrespective of the conducting characteristics of the latter.

Various modifications may be made within the scope of the present invention.

We claim:

1. An inverter circuit comprising a direct current source, two semiconductor switching devices connected to said source and adapted to be operated at a predetermined frequency cyclically and alternately in opposite directions, an output circuit including a load and a capacitor in parallel, a pair of resonant circuits each connected in series with a said switching device and each including said capacitor and an inductor, said resonant circuits having a resonant frequency not less than the operating frequency, each said inductor being in series with the circuit including said capacitor and load in parallel, and a pair of rectifiers each connected in reverse parallel with a said switching device whereby when each switching device is switched off, its associated rectifier permits the reverse flow of current in and under the effect of the associated resonant circuit to assist the discharge of the capacitor and its recharging with opposite polarity by the flow of current through the other switching device in the other resonant circuit, this effect being repeated cyclically and alternately.

2. The circuit of claim 1, said output circuit including a transformer having a center-tapped primary winding connected to said source and a secondary winding, connected to said load and capacitor.

References Cited by the Examiner

UNITED STATES PATENTS

| 2,965,856 | 12/1960 | Roesel | 321—2 X |
| 3,075,136 | 1/1963 | Jones | 321—45 |
| 3,120,633 | 2/1964 | Genuit | 321—45 |

OTHER REFERENCES

General Electric Controlled Rectifier Manual, 1960, pages 138 and 139. TK 2798 G4g.

LLOYD McCOLLUM, *Primary Examiner.*